(12) United States Patent
Liu

(10) Patent No.: US 6,510,482 B1
(45) Date of Patent: Jan. 21, 2003

(54) MULTIPLEXED BUS DATA TRANSMISSION CONTROL SYSTEM

(75) Inventor: Chen-Tsung Liu, Hsin Chu (TW)

(73) Assignee: Integrated Technology Express Inc., Hsinchu (TW)

(*) Notice: Subject to any disclaimer, the term of this patent is extended or adjusted under 35 U.S.C. 154(b) by 0 days.

(21) Appl. No.: 09/557,342

(22) Filed: Apr. 25, 2000

(51) Int. Cl.$^7$ ................................................. G06F 13/38
(52) U.S. Cl. ........................ 710/305; 710/306; 710/29; 712/28; 370/229
(58) Field of Search ..................... 710/29, 305, 306; 370/435, 465, 420, 231, 236; 712/3, 28; 714/43; 375/219; 327/158; 455/266

(56) References Cited

U.S. PATENT DOCUMENTS

| | | | | |
|---|---|---|---|---|
| 4,100,377 A | * | 7/1978 | Flanagan | 370/435 |
| 5,303,413 A | * | 4/1994 | Braegas | 455/266 |
| 5,819,054 A | * | 10/1998 | Ninomiya et al. | 712/3 |
| 5,872,992 A | * | 2/1999 | Tietjen et al. | 712/28 |
| 6,047,346 A | * | 4/2000 | Lau et al. | 327/158 |
| 6,263,016 B1 | * | 7/2001 | Bellenger et al. | 375/222 |
| 6,320,867 B1 | * | 11/2001 | Bellenger et al. | 370/420 |

* cited by examiner

Primary Examiner—Rupal Dharia
Assistant Examiner—Benjamin Ortiz
(74) Attorney, Agent, or Firm—J.C. Patents

(57) ABSTRACT

A multiplexed bus data transmission control system, suitable for a multiplexed bus data flow control, according to the invention. The system includes a bus flow monitor, a critical value controller and a transmission control unit. The bus flow monitor is used to calculate the data flow of the multiplexed bus and to output a calculated result according to a time constant. The critical value controller receives the calculate result and outputs a corresponding critical value according to a ratio of the calculated result and the time constant. The transmission control unit is used to control a data transmission device using the multiplexed bus according to the critical value outputted from the critical value controller.

10 Claims, 4 Drawing Sheets

MULTIPLEXED BUS DATA TRANSMISSION CONTROL SYSTEM

BACKGROUND OF THE INVENTION

1. Field of the Invention

The invention relates to a bus control system and a method using the same, and more particularly to a multiplexed bus data transmission control system and a method using the same.

2. Description of the Related Art

Referring to FIG. 1A, a control system for data transmission between two different buses 110 and 115 according to the prior art is shown. Since the bus 110 is multiplexed, it is necessary to have a buffer 125 if data needs to be transmitted from the bus 115 to the bus 110. The time that data are transmitted from the buffer 125 to the bus 110 is controlled by a controller 120. According to a constant critical value, the controller 120 controls the buffer 125 for data transmission. For example, when the amount of data stored in the buffer 125 is larger than the critical value, the controller 120 allows the data stored in the buffer 125 to be transmitted to the bus 110.

Referring further to FIG. 1B, a data transmission control system for a PCI device 135 is shown. In general, the PCI device 135 has a function of delayed transmission. Whether to perform the function of delayed transmission can be controlled using a register 140. Although software can be used to set up the value stored in the register thereby to determine whether to perform the function of delayed transmission, software does not know the condition of data flow on a bus 130. Therefore, there is only two states, a delayed transmission sate and a non-delayed transmission state, for the data transmission control system.

As described above, it is really inflexible for data transmission control in the prior art. That is, no matter how the amount of data flow is, only two states are used to control data transmission for the conventional data transmission control system.

Referring to FIG. 2A, a timing diagram for data package transmissions with critical values=1 and 4 is shown. L1 represents a timing for a data package transmission with a critical value=1 while L4 represents a timing for another data package transmission with a critical value=4. A1, A2, A3 and A4 represent addresses in which data D1, D2, D3 and D4 are stored, respectively. Referring simultaneously to FIGS. 1A and 2A, a package of current data stored in the buffer 125 can be transmitted to the bus 110 each time a corresponding critical value is equal to 1. When the critical value is equal to 1, it means that the latency for transmitting the package of data is one cycle. That is, there is one cycle assigned for transmitting a package of data right after a corresponding address signal ended. When the critical value is 4, the latency for transmitting a package of data is four cycles. That is, there are four cycles assigned for transmitting. four packages of data right after a corresponding address signal ended. Even though the latency of the former is shorter than that of the latter, the band width occupied of the former is larger that that of the latter. That is, the band width is 8 cycles for the critical value=1 while the band width is 5 cycles for the critical value=4.

Referring to FIG. 2B, a timing diagram for data package transmissions on a PCI bus at a delayed transmission state and a non-delayed transmission state, respectively is shown. R represents a timing for a data package transmission at a delayed transmission state. N represents a timing for a data package transmission at a non-delayed transmission state. D represents a signal indicating that data are ready for transmitting. At the delayed transmission state, a PCI device is repeatedly operated until obtaining R3 data. Inversely, at the non-delayed transmission state, the PCI device occupies the PCI bus until receiving data (for example, data N1). As shown in FIG. 2B, the latency (from the cycle 1 to cycle 12) at the non-delayed transmission state is shorter than that (from cycle 1 to cycle 15) at the delayed transmission state. However, the band width occupied of the former is larger than that of the latter.

As described above, this results in an inflexibility because the conventional data transmission control system is performed only at one of the two states or only can be adjusted by software. However, since software does not detect the condition of the data flow on the bus 130, it can not make a proper adjustment. That is, it is almost useless.

SUMMARY OF THE INVENTION

In view of the above, the invention is to provide a first multiplexed bus data transmission control system, suitable for a multiplexed bus data flow control. The multiplexed bus data transmission control system includes a multiplexed bus, a first bus, a bus flow monitor, a critical value controller, a transmission control unit. The first bus from which data are transmitted to the multiplexed bus via a data transmission device. The bus flow monitor is used to calculate a busy time or an idle time of the multiplexed bus to obtain a result and to output the result according to a time constant. The critical value controller includes a band width decoder and a critical value decoder. The band width decoder receives the result from the bus flow monitor and outputs a ratio between the result and the time constant to the critical value decoder, and the critical value decoder outputs a corresponding critical value as the output of the critical value controller according to the ratio calculated by the bandwidth decoder. The transmission control unit is used to control the data transmission of the data transmission device according to the critical value output from the critical value controller.

A second multiplexed bus data transmission control system, suitable for a multiplexed bus data flow control, includes a multiplexed bus, a bus flow monitor, a critical value controller and a transmission control unit. The bus flow monitor is used to calculate the data flow of the multiplexed bus and outputting a calculated result according to a time constant. The critical value controller includes a band width decoder and a critical value decoder. The band width decoder receives the result from the bus flow monitor and outputs a ratio between the result and the time constant to the critical value decoder, and the critical value decoder outputs a corresponding critical value as the output of the critical value controller according to the ratio calculated by the bandwidth decoder. The transmission control unit is used to control a data transmission device using the multiplexed bus according to the critical value output from the critical value controller.

A third multiplexed bus data transmission control system, suitable for a multiplexed bus data flow control, includes a multiplexed bus, a bus flow monitor, a critical value controller and a transmission control unit. The bus flow monitor is used to calculate the data flow of the multiplexed bus and outputting a calculated result according to a time constant. The critical value controller is used to receive the calculate result and to output a corresponding critical value according to a ratio of the calculated result and the time constant. The transmission control unit is used to control a data transmission device using the multiplexed bus according to the critical value outputted from the critical value controller.

Moreover, a method for multiplexed bus data transmission control, suitable for a multiplexed bus data flow control and having a plurality of critical values provided, includes the following steps. A busy time or an idle time of the multiplexed bus is calculated to obtain a calculated result for every time constant. A ratio of the calculated result and the time constant is calculated. A corresponding critical value according to the ratio is outputted. A data transmission device using the multiplexed bus is controlled according to the critical value.

As described above, the advantage of the invention is that various transmission ways adopted can be determined to optimize the performance of the multiplexed bus, according to the condition of the data flow.

BRIEF DESCRIPTION OF THE DRAWINGS

The invention will become more fully understood from the detailed description given hereinafter and the accompanying drawings which are given by way of illustration only, and thus do not limit the present invention, and wherein.

DETAILED DESCRIPTION OF THE PREFERRED EMBODIMENT

Figure 1A:
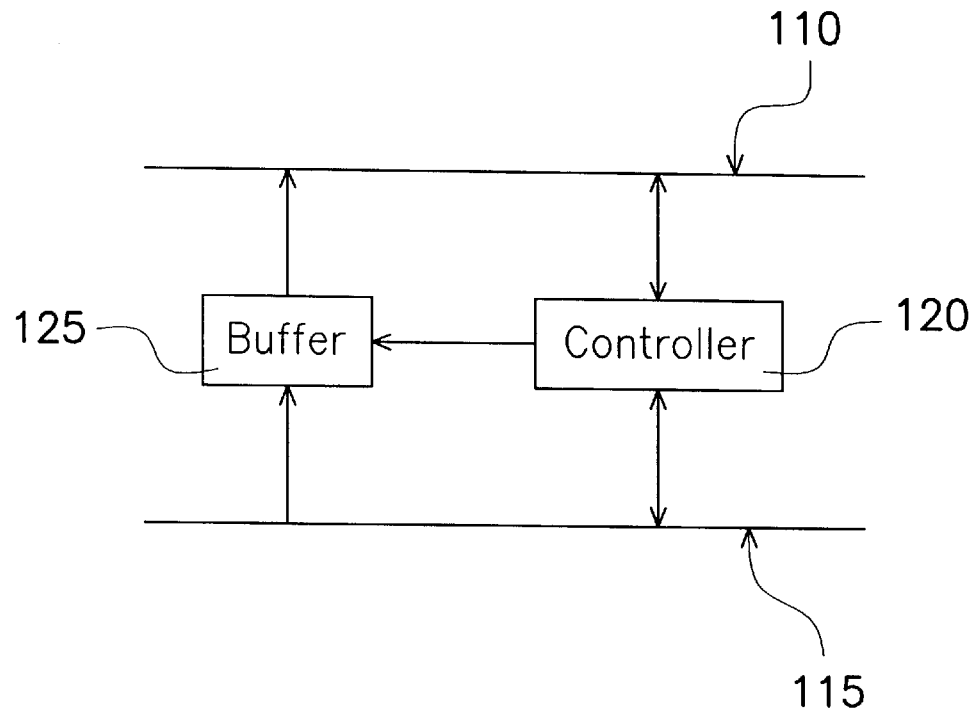
FIG. 1A is a block circuit diagram showing a data transmission control system between two different buses.
Figure 1B:
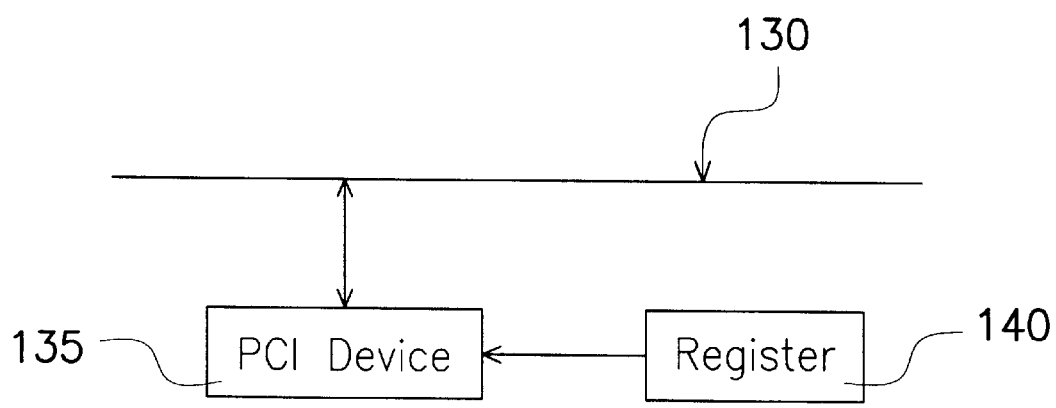
FIG. 1B is a block circuit diagram showing a data transmission control system for a PCI device.
Figure 2A:
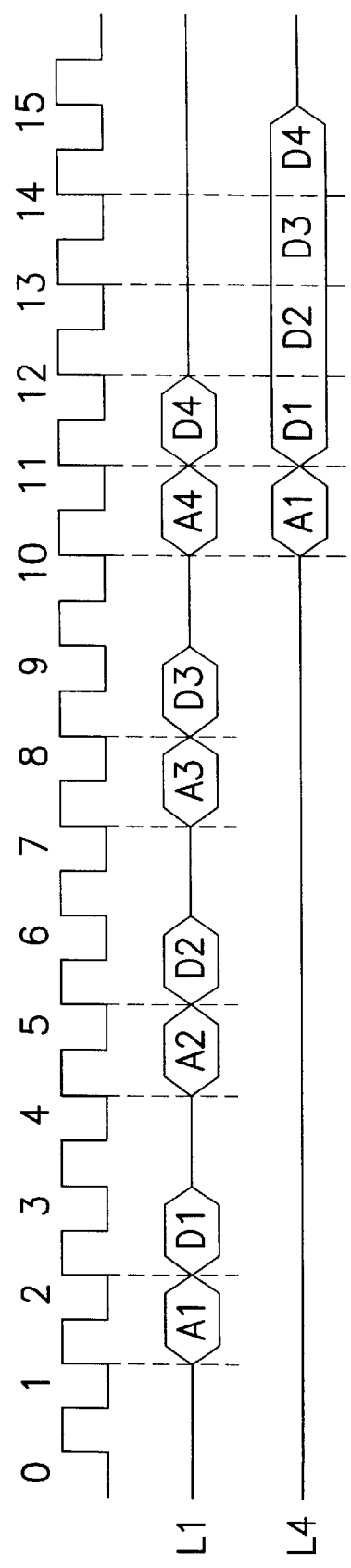
FIG. 2A is a timing diagram showing data package transmissions with critical values=1 and 4.
Figure 2B:
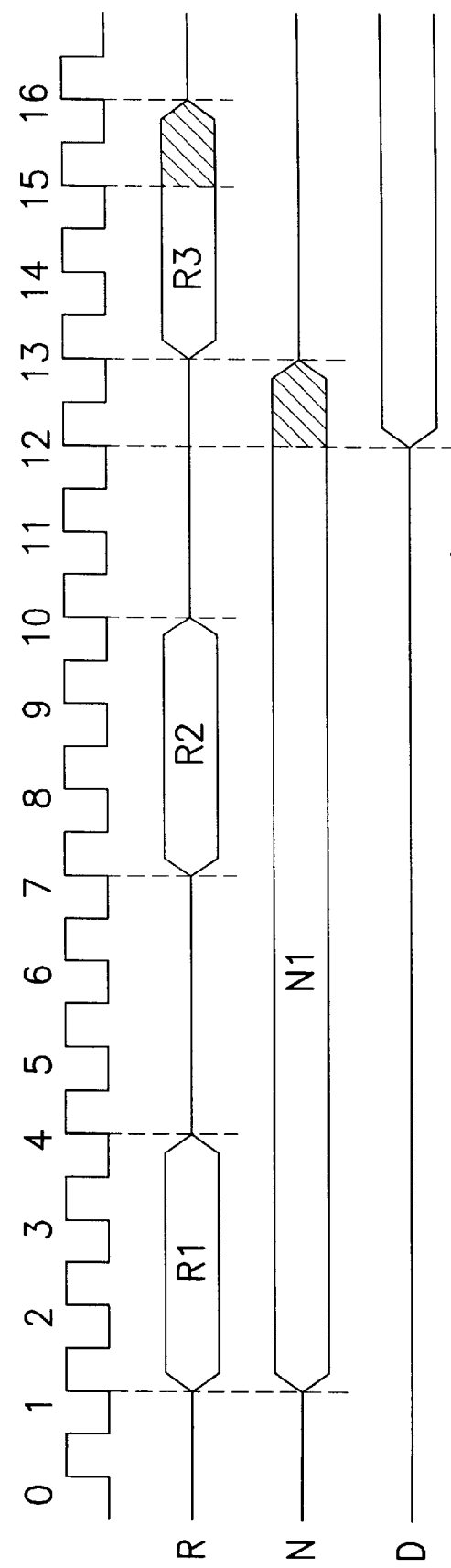
FIG. 2B is a timing diagram showing data package transmissions with a delayed transmission and without a delayed transmission in the PCI bus.
Figure 3:
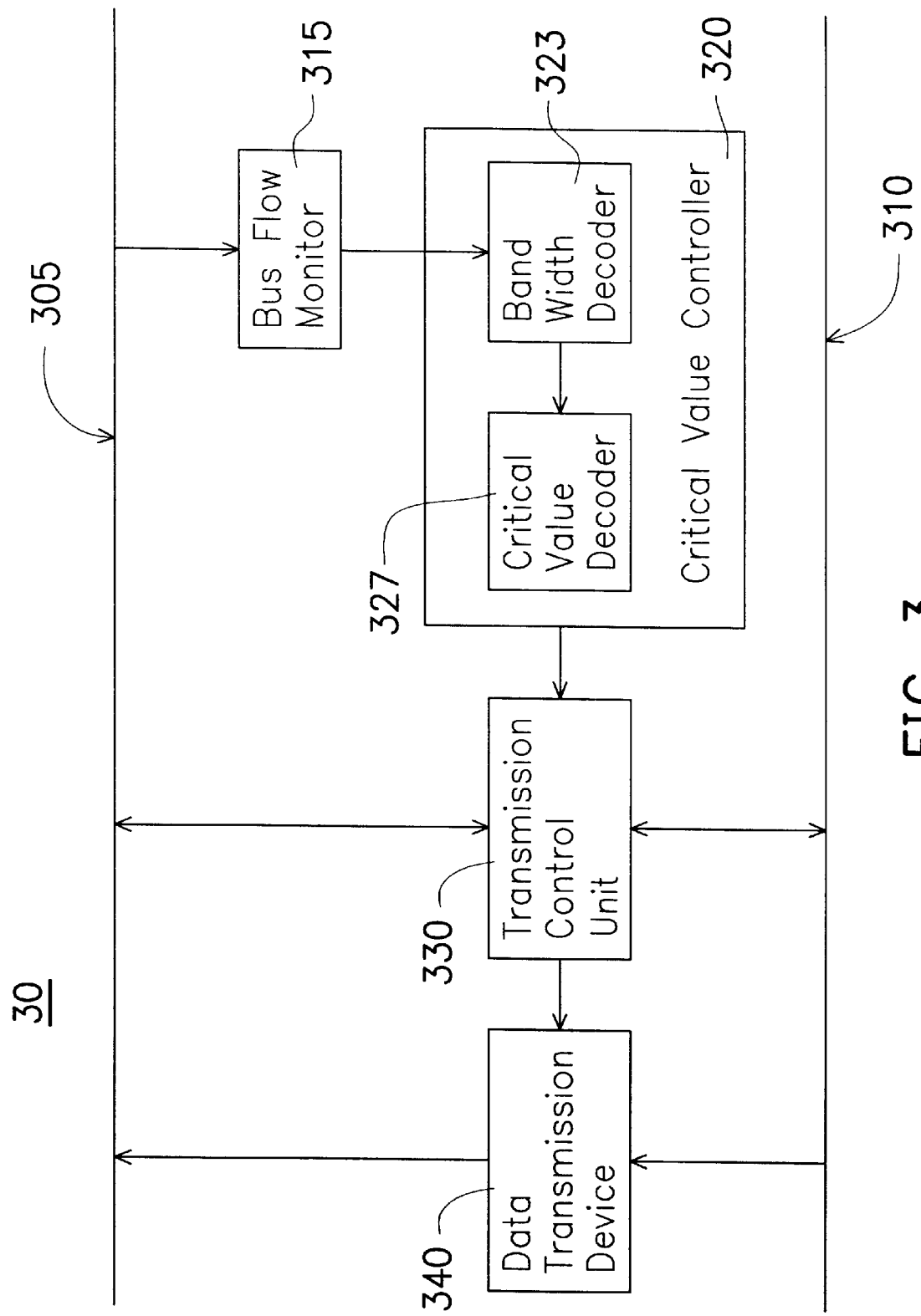
FIG. 3 is a block circuit diagram showing a multiplexed bus data transmission system according to a first embodiment of the invention.

Referring to FIG. 3, a multiplexed data transmission control system according to a first embodiment is shown. In the first embodiment, a multiplexed bus data transmission control system 30 is used for a multiplexed bus 305 and another bus 310. The data transmission control system 30 includes a bus flow monitor 315, a critical value controller 320, a transmission control unit 330 and a data transmission device 340. Moreover, the critical value controller 320 includes a band width decoder 323 and a critical value decoder 327.

By monitoring the data flow on the multiplexed bus 305, the bus flow monitor 315 can output a calculated result to the critical value controller 320 every constant time interval. A way to monitor the data flow on the multiplexed bus 315 can be achieved by counting the time spent at a use state or a standby state of the multiplexed bus 305. For example, in the multiplexed data transmission control system 30 with 1000 cycles serving as a time constant, the calculated result can be obtained by measuring the busy time or the idle time of the multiplexed bus 305.

After the calculated result is transmitted to the critical value controller 320, the band width decoder 323 makes the calculated result be divided by the time constant. Therefore, a ratio of the calculated result and time constant can be obtained. Next, the ratio is transmitted to the critical value decoder 327. In the critical value decoder 327, several critical values are provided. Each critical value is corresponding to a certain range of ratio. For example, when a critical value is 1, a corresponding range of ratio is from 0 to 0.25; when a critical value is 2, a corresponding range of ratio is from 0.25 to 0.5; when a critical value is 3, a corresponding range of ratio is from 0.5 to 0.75; when a critical value is 4, a corresponding range of ratio is from 0.75 to 1. If the ratio is 0.2, the critical value decoder 327 outputs a corresponding critical value 1. If the ratio is 0.7, the critical value decoder 327 outputs a corresponding critical value 3. The critical value outputted from the critical value controller 320 is then transmitted to the transmission control unit 330.

The transmission control unit 330 controls the data transmission of the data transmission device 340 according to a critical value outputted from the critical value controller 320. The critical value can be flexibly adjusted between an occupied band width and a delayed time by the data transmission control system. Therefore, the multiplexed bus can be efficiently employed.

It should be noted that the data transmission control system not only can be applied to a multiplexed bus inside a computer, but to other multiplexed data transmission paths, such as a network transmission path.

Figure 4:
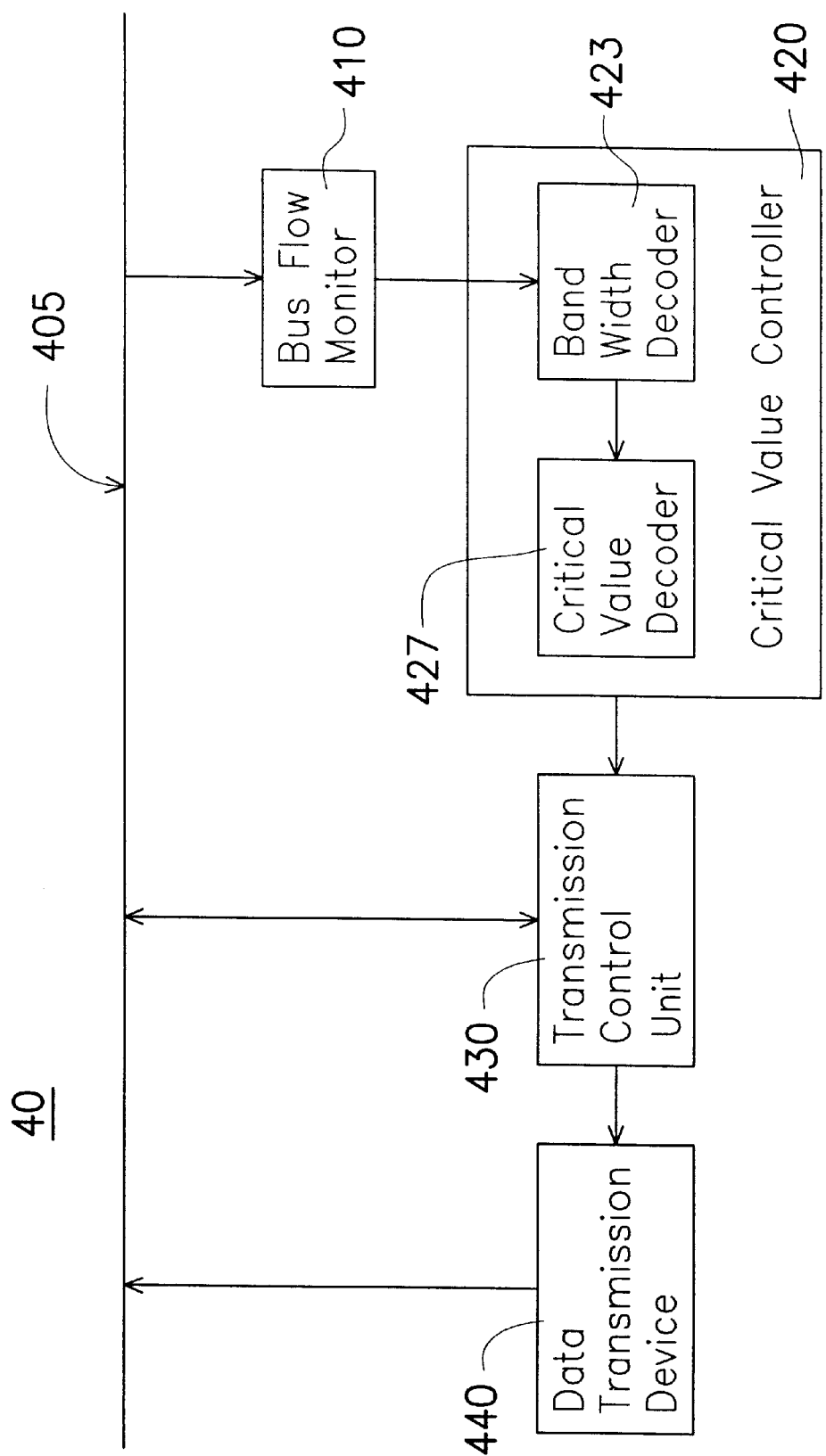
FIG. 4 is a block circuit diagram showing a multiplexed bus data transmission system according to a second embodiment of the invention.

Referring to FIG. 4, a data transmission control system according to a second embodiment is shown. A multiplexed bus data transmission control system 40 used for a multiplexed bus 405 includes a bus flow monitor 410, a critical value controller 420, a transmission control unit 430 and a data transmission device 440. Moreover, the critical controller 420 includes a band width decoder 423 and a critical value decoder 427.

By monitoring the data flow of the multiplexed bus 405, the bus flow monitor 410 can output a calculated result to the critical value controller 420 every constant time interval. A way to monitor the data flow of the multiplexed bus 405 can be achieved by counting the time spent at a use state or a standby state of the multiplexed bus 405. For example, in the multiplexed data transmission control system 40 with 1000 cycles serving as a time constant, the calculated result can be obtained by measuring the busy time or the idle time of the multiplexed bus 405.

After the calculated result is transmitted to the critical value controller 420, the band width decoder 423 makes the calculated result be divided by the time constant. Therefore, a ratio of the calculated result and time constant can be obtained. Next, the ratio is transmitted to the critical value decoder 427. In the critical value decoder 427, several critical values are provided. Each critical value is corresponding to a certain range of ratio. The transmission control unit 430 controls the data transmission of the data transmission device 440 according to a critical value outputted from the critical value controller 420.

When the data transmission control system 40 is applied to a PCI bus, an output signal of the critical controller 420 can determine whether to perform a delayed transmission. In the second embodiment, the transmission control unit 430 is a register which stores a value used to determine whether to perform a delayed transmission. Through the control of the register, the data transmission device 440, such as a PCI device in a PCI system, can operate between a delayed transmission state and a non-delayed transmission state.

It should be noted that it is unnecessary to build the transmission control unit 430 outside the data transmission device 440 or the critical value controller 420. That is, the transmission control unit 430 can be built together with the data transmission device 440 or the critical value controller 420. The critical value decoder 423 not only can provide a critical value, but a signal used to determine whether to perform a delayed transmission, directly.

As described above, the advantage of the invention is that various transmission ways adopted can be determined to optimize the performance of the multiplexed bus, according to the condition of the data flow.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A multiplexed bus data transmission control system, suitable for a multiplexed bus data flow control, comprising:
   a multiplexed bus;
   a first bus from which data are transmitted to the multiplexed bus via a data transmission device;
   a bus flow monitor for calculating a busy time or an idle time of the multiplexed bus to obtain a result and outputting the result according to a time constant;
   a critical value controller including a band width decoder and a critical value decoder, wherein the band width decoder receives the result from the bus flow monitor and outputs a ratio between the result and the time constant to the critical value decoder and the critical value decoder outputs a corresponding critical value as the output of the critical value controller according to the ratio; and
   a transmission control unit for controlling the data transmission of the data transmission device according to the critical value outputted from the critical value controller.

2. A multiplexed bus data transmission control system, suitable for a multiplexed bus data flow control, comprising:
   a multiplexed bus;
   a bus flow monitor for calculating the data flow of the multiplexed bus and outputting a calculated result according to a time constant;
   a critical value controller including a band width decoder and a critical value decoder, wherein the band width decoder receives the result from the bus flow monitor and outputs a ratio between the result and the time constant to the critical value decoder and the critical value decoder outputs a corresponding critical value as the output of the critical value controller according to the ratio; and
   a transmission control unit for controlling a data transmission device using the multiplexed bus according to the critical value outputted from the critical value controller.

3. The multiplexed bus data transmission control system as claimed in claim 2, further comprising a first bus from which data are transmitted to the multiplexed bus via the data transmission device.

4. The multiplexed bus data transmission control system as claimed in claim 2, wherein the bus flow monitor is used to calculate a busy time or an idle time of the multiplexed bus thereby to obtain a result and outputting the result according to a time constant.

5. The multiplexed bus data transmission control system as claimed in claim 2, wherein the critical value serves as a signal used to determine whether to perform a delayed transmission.

6. A multiplexed bus data transmission control system, suitable for a multiplexed bus data flow control, comprising:
   a multiplexed bus;
   a bus flow monitor for calculating the data flow of the multiplexed bus and outputting a calculated result according to a time constant;
   a critical value controller for receiving the calculate result from the bus flow monitor and outputting a corresponding critical value according to a ratio of the calculated result and the time constant; and
   a transmission control unit for controlling a data transmission device using the multiplexed bus according to the critical value outputted from the critical value controller.

7. The multiplexed bus data transmission control system as claimed in claim 6, wherein the critical value serves as a signal used to determine whether to perform a delayed transmission.

8. A method for multiplexed bus data transmission control, suitable for a multiplexed bus data flow control and having a plurality of critical values provided, comprising the steps of:
   calculating a busy time or an idle time of the multiplexed bus to obtain a calculated result every time constant;
   calculating a ratio of the calculated result and the time constant;
   outputting a corresponding critical value according to the ratio; and
   controlling a data transmission device using the multiplexed bus according to the critical value.

9. The multiplexed bus data transmission control method as claimed in claim 8, further comprising dividing the ratio into a plurality of segments, each segment corresponding to a critical value.

10. The multiplexed bus data transmission control method as claimed in claim 8, wherein the critical value serves as a signal used to determine whether to perform a delayed transmission.

* * * * *